(12) United States Patent  
Geiger (10) Patent No.: US 9,909,904 B2
(45) Date of Patent: Mar. 6, 2018

(54) OPTICAL FIBRE SENSOR SYSTEM (71) Applicants: mic AG, München (DE); Zintera Corporation, La Jolla, CA (US)

(72) Inventor: Hans Geiger, Wessobrunn (DE)

( * ) Notice: Subject to any disclaimer, the term of this patent is extended or adjusted under 35 U.S.C. 154(b) by 0 days.

(21) Appl. No.: 15/305,073

(22) PCT Filed: Apr. 20, 2015

(86) PCT No.: PCT/EP2015/058522
§ 371 (c)(1),
(2) Date: Oct. 18, 2016

(87) PCT Pub. No.: WO2015/158926
PCT Pub. Date: Oct. 22, 2015

(65) Prior Publication Data
US 2017/0184426 A1 Jun. 29, 2017

(30) Foreign Application Priority Data
Apr. 18, 2014 (GB) .................................. 1407011.4

(51) Int. Cl.
*G01D 5/353* (2006.01)
*G01M 3/38* (2006.01)
*G01H 9/00* (2006.01)

(52) U.S. Cl.
CPC ......... *G01D 5/35358* (2013.01); *G01H 9/004* (2013.01); *G01M 3/38* (2013.01)

(58) Field of Classification Search
CPC ....... G01D 5/35358; G01H 9/004; G01N 3/38
See application file for complete search history.

(56) References Cited

U.S. PATENT DOCUMENTS

2007/0247631 A1* 10/2007 Paulson ................ G01M 3/047
356/483
2012/0130930 A1 5/2012 Klar et al.

FOREIGN PATENT DOCUMENTS

DE 19652925 A1 7/1998

OTHER PUBLICATIONS

International Search Report Issued in PCT/EP2015/058522 dated Jul. 13, 2015.

* cited by examiner

*Primary Examiner* — Mark R Gaworecki
(74) *Attorney, Agent, or Firm* — Mintz Levin Cohn Ferris Glovsky and Popeo, P.C.

(57) ABSTRACT

An optical fiber sensor system and a method for determining a location of a disturbance having a signal processor with a plurality of activation cells adapted to react to components of a back-scattered signal and label the disturbance.

25 Claims, 3 Drawing Sheets

OPTICAL FIBRE SENSOR SYSTEM

CROSS-REFERENCES TO RELATED APPLICATIONS

This application is a national stage entry, filed under 35 U.S.C. § 371, of International Application No. PCT/EP2015/058522, filed on Apr. 20, 2015, and claims the benefit of and priority to UK Patent Application No. 1407011.4, filed Apr. 18, 2014, the entire contents of which is hereby incorporated herein by reference in its entirety and for all purposes.

BACKGROUND OF THE INVENTION

Field of the Invention

The invention relates to an optical fibre sensor system and a method for determining a location of a disturbance.

Introduction to the Invention

Oil, water, gas and other product pipelines form a critical network in every part of the world and are an easy target for intruders. The pipelines are also susceptible to earthquakes, tsunamis and to other geohazard incidents. Monitoring the pipelines in order to keep the pipelines safe from damage is a major challenge. The long distances, often through remote and hostile territory, make the costs of most conventional monitoring systems prohibitive. If an oil or gas pipeline is damaged it can have devastating impacts on human life and health due to explosions, fire and contamination; environment due to poisoning of flora and fauna, as well as the associated financial losses and damage to both image and reputation.

The pipelines are susceptible to various types of third-party interference, such as deliberate acts (illegal tapping, sabotage) or unintended disruption (construction work, farming). This third-party interference can cause huge financial and environmental damage and loss of reputation to the pipeline operators. A reliable, real-time pipeline monitoring system is therefore required in order to detect events of interest and thereby protect nature, human health and economic interests.

According to a survey in 2009, about 36% of all worldwide pipeline leaks were caused by third party interference (TPI), such as illegal tapping, sabotage or construction work. Examples of the events of interest due to third party interference include: 4 Oct. 2001 Fairbanks Ak. (USA), 990 t oil due to sabotage; 2000 Tschernigow, Ukraine, loss of 500,000 liters diesel due to illegal tapping; 10 Jun. 1999 Bellingham, Whatcorn Creek, Wash. (USA), 880 t petrol due to construction work, financial damage USD 45 million.

Illegal tapping is a major problem in emerging countries like India, China and South America. In 2011 for example, Petróleos Mexicanos (PEMEX) counted 1,324 cases of illegal tapping in Mexico. Every day Pemex estimates a loss of 40,000 liters of oil and gas, which sums up to an annual damage of more than 1 billion US$ of loss. Such damage could be avoided or substantially reduced, if third party interference was detected before or close to the occurrence of the interference.

Many times the pipeline monitoring is done by walking, driving and flying along the pipeline. The annual costs for walking and driving the line vary from € 100 to € 350 per kilometer. The additional costs for flying the line amount to € 4.50 per kilometer. Usually two inspections are performed per month, which adds up to € 108 per kilometer (€ 4.50/km×2 flights/month×12 months). The annual costs are between € 208 and € 458 per kilometer.

Description of the Related Art

A number of systems for the sensing of an acoustic disturbance are known. The acoustic disturbance can be representative of damage to the pipelines through third party interference or geohazards, as described in the introduction, or potential damage due to approaching vehicles or individuals intending to damage the pipeline. These systems involve the use of an optical fibre laid alongside the pipeline, which acts as a sensor and detects changes in the pattern of back-scattered radiation in order to sense an acoustic disturbance. For example, Pimon GmbH, Munich, Germany, sells an apparatus PMS2500-vibrO that utilizes distributed fibre optical sensing technology to detect the acoustic disturbance. The PMS2500-vibrO system combines an optical time domain reflectometer (OTDR) with an analysis and pattern recognition software and offers a customized interface with geographic information system (GIS) mapping.

International Patent Applications No WO 2011/05813, WO 2011/015812 and WO 2011/059501 (QinetiQ) all teach various aspects of using a distributed fibre optic sensing system for establishing events of interest. Similarly UK Patent Application No GB 2 491 658 also teaches a method and system for locating an acoustic disturbance. These patent applications all have in common that the systems analyse the back-scattered radiation from the optical fibre to establish the event of interest. Such systems are useful in determining an event of interest from the acoustic disturbance, but the systems are known to produce "false positives" in which events are identified that are of no interest and fail to identify some events of interest, in particular when such events of interest have not been seen before.

One solution to the issue of incorrect identification of events would be to use an artificial neural network (ANN) to train the system to recognise the event of interest. The ANNs are computational models and are inspired by animal central nervous systems, in particular the brain, that are capable of machine learning and pattern recognition. The ANNs are usually presented as a system of nodes or "neurons" connected by "synapses" that can compute values from inputs, by feeding information from the inputs through the ANN. The synapses are the mechanism by which one of the neurons passes a signal to another one of the neurons.

One example of the A is for the recognition of handwriting. A set of input neurons may be activated by pixels in a camera of an input image representing a letter or a digit. The activations of these input neurons are then passed on, weighted and transformed by some function determined by a designer of the ANN to other neurons, etc. until finally an output neuron is activated that determines which character (letter or digit) was imaged. ANNs have been used to solve a wide variety of tasks that are hard to solve using ordinary rule-based programming, including computer vision and speech recognition.

There is no single formal definition of an ANN. Commonly a class of statistical models will be termed "neural" if the class consists of sets of adaptive weights (numerical parameters that are tuned by a learning algorithm) and are capable of approximating non-linear functions of the inputs of the statistical models. The adaptive weights can be thought of as the strength of the connections (synapses) between the neurons.

The ANNs have to be trained in order to produce understandable results. There are three major learning paradigms: supervised learning, unsupervised learning and reinforcement learning.

In a supervised learning, the learning paradigms all have in common that a set of pre-analysed data, for example a waveform, is analysed by the ANN and the weights of the connections (synapses) between the neurons in the ANN are adapted such that the output of the ANN is correlated with a known event. There is a cost involved in this training. An improvement in the efficiency of the results of the ANN can be obtained by using a greater number of data items representing the known event in a training set. The greater number of data items requires, however, an increase in computational power and time for the analysis in order to get the correct results. There is therefore a trade-off that needs to be established between the time taken to train the A and the accuracy of the results.

Recent developments in the ANNs involve so-called 'deep learning'. Deep learning is a set of algorithms that attempt to use layered models of inputs. Jeffrey Heaton, University of Toronto, has discussed deep learning in a review article entitled 'Learning Multiple Layers of Representation' published in Trends in Cognitive Sciences, vol. 11, No. 10, pages 428 to 434, 2007. This publication describes multi-layer neural networks that contain top-down connections and training of the multilayer neural networks one layer at a time to generate sensory data, rather than merely classifying the data.

Neuron activity in the prior art ANNs is computed for a series of discrete time steps and not by using a continuous parameter. The activity level of the neuron is usually defined by a so-called "activity value", which is set to be either 0 or 1, and which describes an 'action potential' at a time step t. The connections between the neurons, i.e. the synapses, are weighted with a weighting coefficient, which is usually chosen have a value in the interval [−1.0, +1.0]. Negative values of the weighting coefficient represent "inhibitory synapses" and positive values of the weighting coefficient indicate "excitatory values". The computation of the activity value in the ANNs uses a simple linear summation model in which weighted ones of some or all of the active inputs received on the synapses at a neuron are compared with a (fixed) threshold value of the neuron. If the summation results in a value that is greater than the threshold value, the following neuron is activated.

One example of a learning system is described in international patent application No. WO 1998 027 511 (Geiger), which teaches a method of detecting image characteristics, irrespective of size or position. The method involves using several signal-generating devices, whose outputs represent image information in the form of characteristics evaluated using non-linear combination functions.

International patent application No. WO 2003 017252 relates to a method for recognizing a phonetic sound sequence or character sequence. The phonetic sound sequence or character sequence is initially fed to the neural network and a sequence of characteristics is formed from the phonetic sequence or the character sequence by taking into consideration stored phonetic and/or lexical information, which is based on a character string sequence. The device recognizes the phonetic and the character sequences by using a large knowledge store having been previously programmed.

An article by Hans Geiger and Thomas Waschulzik entitled 'Theorie and Anwendung strukturierte konnektionistische Systeme', published in Informatik-Fachreichte, Springer-Verlag, 1990, pages 143-152 also describes an implementation of a neural network. The neurons in the ANN of this article have activity values between zero and 255. The activity values of each one of the neurons changes with time such that, even if the inputs to the neuron remain unchanged. The output activity value of the neuron would change over time. This article teaches the concept that the activity value of any one of the nodes is dependent at least partly on the results of earlier activities. The article also includes brief details of the ways in which system may be developed.

The ANNs of the prior art need to be trained using patterns indicative of events of interest. They may then be good at recognising such "known" events of interest, but can fail if the event is own which will lead to a pattern of back-scattered radiation in the fibre optic that is unknown. The ANNs also rely on the events of interest being correctly programmed and identified by an expert and also that the selection of weighted factors to determine the event of interest is also known.

One further type of event that is difficult to detect with current systems is an event that is best identified from a sequence of events. Suppose, for example, that a group of individuals wish to tap an oil pipeline in order to take some of the oil. The sequence of events will probably involve an excavator approaching the pipeline and possible going backwards and forwards over the pipeline before stopping and putting out its supporting feet to stabilise the excavator. The excavator begins to excavate a large hole near the pipeline followed by manual digging by a group of, for example, three to five people near to the pipeline. Subsequently, the excavator will be driven off and a valve placed in the pipeline to remove the oil. A tanker arrives to remove the tapped oil. Each of these individual events may in themselves not be of concern (although the manufal digging near the pipeline may be indicative of an attempt to steal oil). However, the entire sequence of events will be highly relevant. There is therefore a need for a system that is able to combine the signals from all of the events in order to identify the attempt to steal the oil.

In some instances, the valve is left in place and re-used to tap the oil. This will lead to a different set of detected events. If the location can be correlated with a location in which an unusual set of events had previously been detected, then there is a need to provide an urgent warning that a further attempt at extracting oil is being made.

SUMMARY OF THE INVENTION

The principal of the method and apparatus of determining locations of disturbances or events of interest as described in this disclosure is based upon analysing back-scattered radiation from an optical fibre using a signal processor formed from a so-called biologically inspired neural network (BNN). The activity of any one of the neurons in the BNN is simulated as a biophysical process. The basic neural property of the neuron is a "membrane voltage", which in (wet) biology is influenced by ion channels in the membrane. The action potential of the neuron is generated dependent on this membrane voltage, but also includes a stochastic (random) component, in which only the probability of the action potential is computed. The action potential itself is generated in a random manner. The membrane has in biology some additional electro-chemical property affects, such as absolute and relative refractory periods, adaptation and sensitization that are automatically included in the BNN of this disclosure.

The basic information transferred from one of the neurons to another one of the neurons is not merely the action potential (or firing rate, as will be described later), but also a time dependent pattern of the action potentials. This time-dependent pattern of action potentials is described as a single spike model (SSM). This means that the interaction between inputs from any two of the neurons is more complex than a simple linear summation of the activities.

The connections between the neurons (synapses) may have different types. The synapses are not nearly just excitatory or inhibitory (as is the case with an ANN), but may have other properties. For example, the topology of a dendritic tree connecting the individual neurons can also be taken into account. The relative location of the synapses from the two of the input neurons on a dendrite in the dendritic tree may also have a large influence on the direction between the two neurons.

In addition to the signal processer, the optical fibre sensor system of this disclosure comprises an optical fibre with a radiation source for launching radiation into the optical fibre and a detector for detecting a back-scattered radiation, which is back-scattered from the optical fibre.

In one aspect of the disclosure, the radiation source produces infrared light in a series of optical pulses.

The disclosure also teaches a method for determining a location of a disturbance or event of interest, which comprises launching radiation into the optical fibre and detecting the back-scattered radiation from the optical fibre. The back-scattered radiation is processed to produce a plurality of values and this plurality of values is then passed into the signal processor for analysis. The signal processer accepts the values at a plurality of first-activation cells and triggers first outputs from the first activation cells. The first outputs are passed to at least a subset of the second activation cells and thereafter second outputs are triggered from this subset of the second activation cells. The second outputs from the plurality of subsets of the second activation cells are summed in order to produce an output value relating to the disturbance. The disturbance is identified by reference of the output value to a pattern of previously stored back-scattered radiation representing sound profiles of known events.

The signal processor of the disclosure is self-learning and is able to learn and combine different "noises" of the one and same event or from a related sequence of events. The signal processor combines and compares different noise prints and their specific characteristics and sound levels in order to differentiate between a normal disturbance, such as field work of farmers, from an event of interest representing a threat, like someone approaching a pipeline with an excavator.

The optical fibre sensor system taught in this disclosure is able to provide: alert in case of emergency with an accurate GIS location, identify threats in real time in order to reduce the risk from leakages caused by digging, drilling, tapping, sabotage, earthquake etc., monitor around 50 km of pipeline with one measuring unit without any additional power supply and with scalability to cover deployments of any length by adding additional units. The system reduces false or irrelevant alarms and has been found to differentiate multiple events down to one meter resolution, as well as track potential intruders, moving in different velocities (vehicles or on foot) along the pipeline. The system can detect direction and speed of the possible intruders.

DETAILED DESCRIPTION OF THE INVENTION

The invention is described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The optical fibre sensor system of this disclosure is based on distributed fibre optical sensing and integrates an optical time domain reflectometer (OTDR) with detection software, as well as a customized interface with geographic information system (GIS) mapping. The fibre optic cables are often already buried near to or attached to the pipeline for telecommunication purposes. The system utilizes a standard single mode telecommunication fibre as a listening device for events of interest.

The optical time-domain reflectometer (OTDR) is an optoelectronic instrument used to characterize optical fibres. The reflectometer injects a series of optical pulses into the optical fibre that is being tested and detects at the same fibre end the returning light that has been reflected or back-scattered from points along the fibre. The OTDR produces a so-called reflectogram from this measurement and performs an efficient, precise and wide analysis of the fibre characteristics.

A laser diode launches radiation in the form of the series of optical pulses into one end of the optical fibre and a photodiode measures the returning light at the same fibre end. The photodiode is part of the OTDR and produces a signal. The returning light comprises reflected light and back-scattered light. The signal detected by the photodiode provides relevant information about the events of interest along the optical fibre. The signal is influenced by irregularities, which the injected optical pulse experiences on its way along the optical fibre. If a certain area within the optical fibre has an attenuation or reflection, for instance caused by a bending or a fibre connector, this attenuation or reflection is detected by differences in the returning signals. The velocity of the optical pulse is known and the exact location of the irregularity can therefore be determined on the basis of the time difference between the injection of the optical pulse and the incidence of the returning signal. The irregularity may indicate an event of interest or other disturbance.

Suppose now that a disturbance or event of interest occurs near the optical fibre. There may be pressure on the optical fibre which will cause at least a small degree of bending of the optical fibre or vibrations/sound waves will briefly change the structure of the optical fibre and these will result in a change of the back-scattered signal. This change can be detected in the OTDR. Suppose that the disturbance is a moving object, then the slight bending of the optical fibre will change location as the moving object moves, enabling the speed and direction of movement of the disturbance to be established.

The optical fibres make a good sensor, as the optical fibres are able to measure disturbances over long distances. The back-scattering of the signals in the optical fibres change on vibrations (e.g. caused by vehicles, footsteps, digging, drilling), on temperature alterations (e.g. caused by escaping pressurized gas), or when optical fibres get strained, bent, kinked, or cut off.

Example

Figure 1:
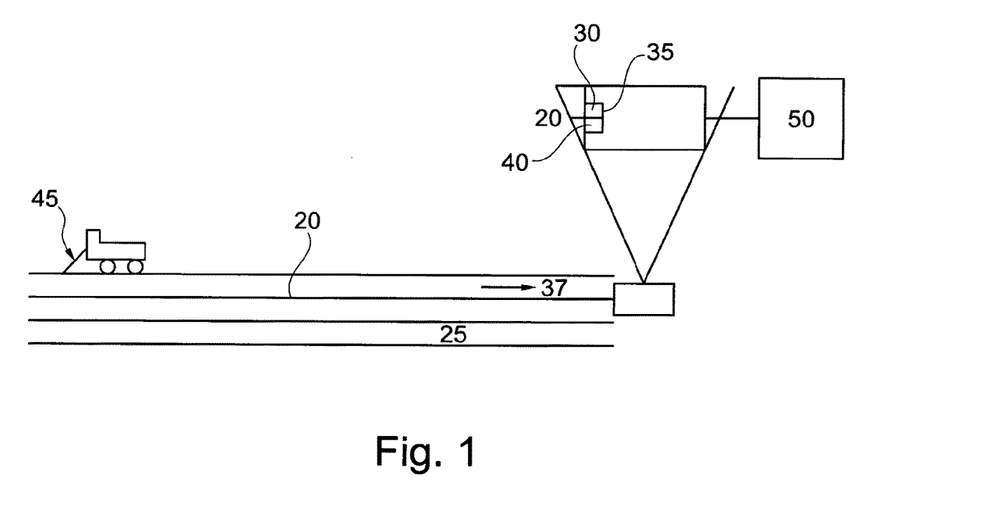
FIG. 1 shows an example of an optical fibre sensor used in the system of the disclosure.

FIG. 1 shows an example of the optical fibre sensor system using the teachings of this disclosure. An optical fibre 20 used in this sensor system can be a specially laid optical fibre 20, which has been placed in a region of interest. The optical fibre 20 can also be a standard telecommunications optical fibre, which generally carries data. The optical fibre 20 can be laid near or directly adjacent to a pipeline 25, as outlined in the introduction to the description. Generally the optical fibre 20 is placed together with other optical fibres in a cable. The optical fibre sensor system of this disclosure uses one of the optical fibres in the cable as a dark optical fibre, i.e. unused. At the other end of the optical fibre 20, an optical terminator should be chosen in one aspect of the invention to avoid reflection from the fibre end.

The optical fibre 20 is connected to a radiation source 30, which in one non-limiting aspect of the invention is a semiconductor laser producing radiation 35 comprising a series of optical pulses at 1.55 µm wavelength and launches the radiation 35 into the optical fibre 20 at repetition rates of, for example, 4 kHz to detect an event of interest at 25 km. Higher repetition rates can be used to detect closer events of interest. There should be only one optical pulse at one time in the optical fibre 20 and therefore the repetition rate can be adjusted accordingly.

The returning back-scattered signal 37 from the optical fibre 20 can be detected by means of a detector 40 at the same end of the optical fibre 20 and is converted into a reflectogram in which the time delay of signal incidence is shown as distance to the event of interest on the optical fibre 20. A highly coherent laser as the radiation source 30 is used in order to increase the sensitivity. Due to this high level of coherence, an interference pattern can be observed in the back-scattered signal 37 (fingerprint). Vibrations cause temporary changes in the structure of the optical fibre 20 and result in temporary changes in this interference pattern. The temporary changes in the interference pattern can be used to detect a disturbance 45, for example third-party interference caused by manual or machine digging. Every kind of incident causes typical sound waves and changes the back-scattered signals 37 leading to differences in the interference pattern. The different kinds of sound waves have characteristics depending on the type of incident and the properties of the ground through which the sound waves are transmitted. The back-scattered signals 37 are received and the signal patterns are digitalized. The signal from the detector 40 passes through to a signal processor 50. The signal processor 50 is able to classify the disturbance 45 and send an alarm to a system operator, if required.

The signal processor 50 is able to separate all "regular" sounds from possible disturbances 45 in the back-scattered signal as well as inoffensive or other irrelevant incidents. The signal processor 50 is also able to recognise a sequence of disturbances 45, which in themselves would be considered to be a non-critical incident, but when combined together lead to a conclusion that the disturbance may be more critical.

Figure 3:
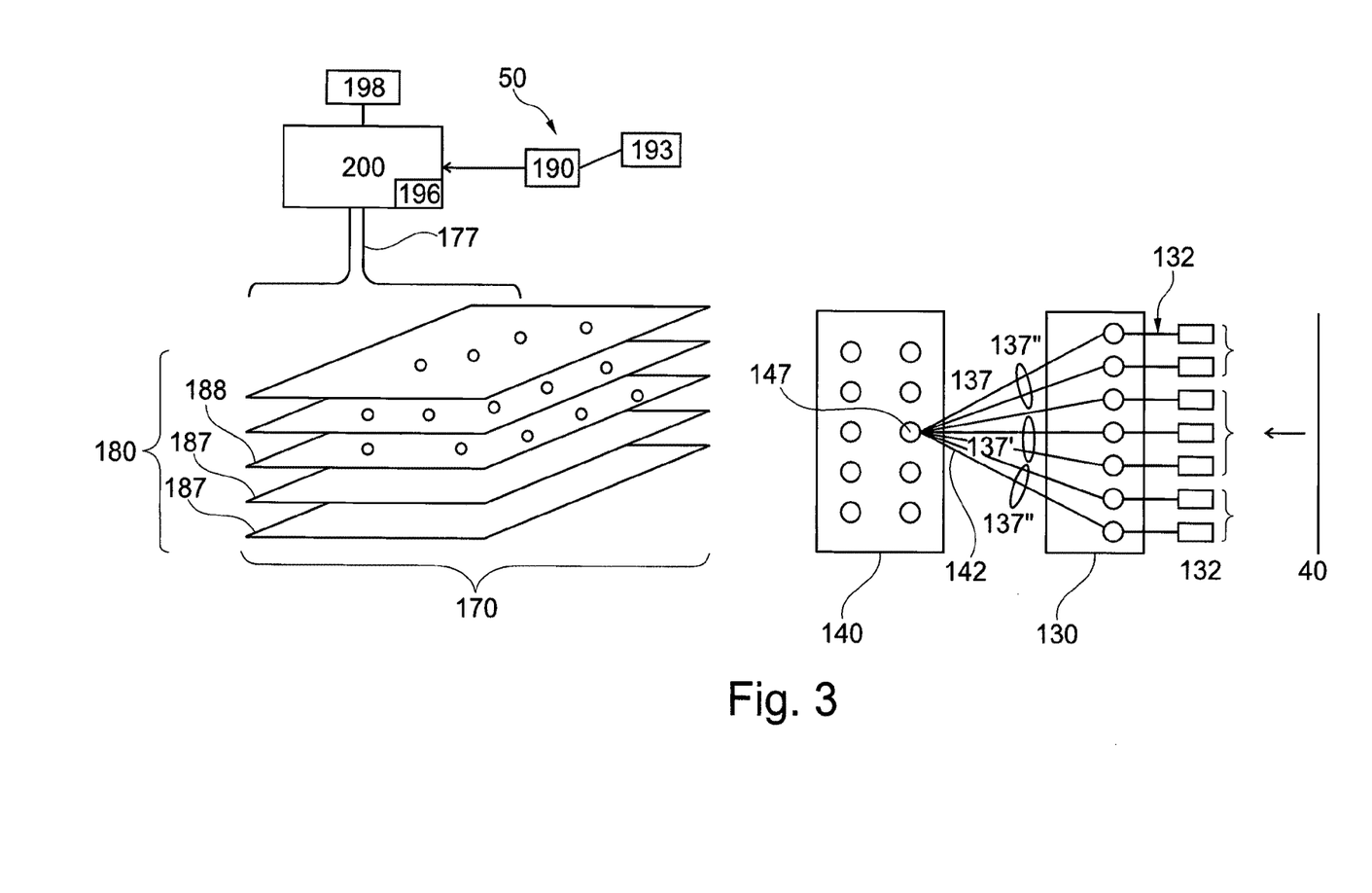
FIG. 3 shows a diagram of the signal processor.

FIG. 3 shows a first example of the signal processor 50 of the disclosure. The signal processor 50 is connected to the detector 40. The signal processor 50 digitises the reflectogram and, for example, a Fourier transformation, Laplace filter, autocorrelation or other methods are applied to produce a plurality of first inputs 132.

The first inputs 132 are passed to a plurality of first activation cells 130. The first activation cells 130 are connected in a one-to-one relationship with the first inputs 132 or a one-to-many relationship with the first inputs 132. In other words, ones of the first activation cells 130 are connected to one or more of the first inputs 132. The number of connections depends on the number of the inputs 120, for example the number of values generated from the interference pattern, and the number of the first activation cells 130

The first activation cells 130 have a first output 137, which comprises a plurality of spikes emitted at an output frequency. In "rest mode", i.e. with no signal from the detector 40 on the first inputs 132, the first activation cells 130 produce the plurality of spikes at an exemplary output frequency of 200 Hz. The first activation cells 130 are therefore an example of a single spike model. The application of the signal derived from the back-scattered signal 37 on the first input 132 increases the output frequency depending on the strength of the back-scattered signal 37 from the detector 40 and is, for example, up to 400 Hz. The change in the output frequency is substantially immediate on the application and removal of the components of the back-scattered signal 37 at the first input 132, in one aspect of the invention. Thus, the first activation cells 130 react to changes in the back-scattered signal 37 almost immediately.

The plurality of first activation cells 130 are connected in a many-to-many relationship with a plurality of second activation cells 140. For simplicity only the connection between one of the second activation cells 140 and an exemplary number of the first activation cells 130 is shown in FIG. 3 The first outputs 137 from the connected ones of the first activation cells 130 are summed over a time period at the connected second activations cell 140.

The values of the first outputs 137 are also combined such that the first outputs 137' from (in this case) the three central first activation cells 130 are added, whilst the outputs 137" from the outer ones of the first activation cells 130 are subtracted from the total output 137. In other words the central three inputs 132 contribute positively to the signal received at an input 142 of the second activation cell 140, whilst the signals from the outer sensors 132" are subtracted. It will be appreciated that the aspect of three central first activation cells 130 and the outer ones of the first activation cells 130 is merely an example. A larger number of first activation cells 130 can be used.

The outputs 137' and 137" are merely one example of the manner in which the outputs 137 can be combined in general. It was explained in the introduction to the description, that the connections (synapses) between the neurons or activation cells are not generally combined in a summation model, but have a stochastic component. This stochastic aspect of the invention in which first activation cells 130 connected to the detector 40 and to the second activation cells 140 is merely one aspect of the invention. The connections can be modified as appropriate.

The second activation cells 140 have different activation levels and response times. The second activation cells 140 also produce spikes at a frequency and the frequency increases dependent on the frequency of the spikes at input signal 142. There is no one-to-one relationship between the output frequency of the second activation cells 140 and the input frequency of the input signal 142. Generally the output frequency will increase with an increase of the input signal 142 and saturates at a threshold value. The dependency varies from one of the second activation cells 140 to another one of the second activation cells 140 and has a stochastic or random component. The response time of the second activation cells 140 also varies. Some of the second activation cells 140 react almost immediately to a change in the input signal 142, whereas other ones require several time periods before the second activation cells 140 react. Some of the second activation cells 140 are turned to rest and issue no second output signal 147 with increased spike frequency when the input signal 142 is removed, whereas other ones remain activated even if the input signal 142 is removed. The duration of the activation of the second activation cell 140 thus varies across the plurality of activation cells 140. The second activation cells 140 also have a 'memory' in which their activation potential depends on previous values of the activation potential. The previous values of the activation potential are further weighted by a decay-factor, so that more recent activations of the second activation cell 40 affects the activation potential more strongly than all the ones.

The second outputs 147 are passed to a plurality of third activation cells 170 arranged in a plurality of layers 180. Each of the plurality of layers 180 comprise a middle layer 185, which is connected to the second outputs 147 and one or more further layers 187, which are connected to third activation cells 170 in other ones of the layers 187. In the example of figure one only five layers 180 are shown, but this is merely illustrative. In one aspect of the invention for the recognition of the reflectogram, seven layers are present. It would be equally possible to have a larger number of layers 180, but this would increase the amount of computing power required.

The second outputs 147 are connected in a many-to-many relationship with the second activation cells 40.

The third activations cells 170 also have different activation levels and different activation times as discussed with respect to the second activation cells 140. The function of the second activation cells 140 is to identify features in the back-scattered signal 37 whereas the function of the third activation cells 170 is to classify the combination of the features.

The third activation cells 170 in one of the layers 180 are connected in a many-to-many relationship with third activation cells 170 in another one of the layers 180. The connections between the third activation cells 170 in the different layers 180 are so arranged that some of the connections are positive and reinforce each other, whilst other ones of the connections are negative and diminish each other. The third activation cells 170 also have a spike output, the frequency of which is dependent on the value of their input.

There is also a feedback loop (265 in FIG. 3) between the output of the third activation cells 170 and the second activation cells 140, which serves as a self-controlling mechanism. The feedback between the third activation cells 170 and the second activation cells 140 is essentially used to discriminate between different features in the reflectogram and to reduce overlapping information. This is done by using the feedback mechanism to initially strengthen the second activation cells 140 relating to a particular feature in the reflectogram to allow that feature to be correctly processed and identified. The feedback then reduces the output of the second activation cells 140 for the identified feature and strengthens the value of the second activation cells 140 related to a further feature. This further feature can then be identified. This feedback is necessary in order to resolve any overlapping features in the reflectogram, which would otherwise result in an incorrect classification.

The processor 50 further includes an input device 190 that is used to input information items 195 relating to the reflectogram. The information items 195 may include a name or a label generally attached to the reflectogram and/or to one or more features in the reflectogram. The input device 190 is connected to a data processor 200 having a memory and which also accepts the third outputs 77. The signal processor 200 compares the third outputs 177 relating to a particular stored feature in the reflectogram with the inputted information items 195 and can associate the particular reflectogram (or a portion thereof) with the inputted information items 195. This association is memorized so that if an unknown pattern or feature in the reflectogram is detected by the detector 40 and the third outputs 177 are substantially similar to the association, the signal processor 200 can determine that u own pattern is in fact a known pattern and output the associated item of information 195 to the user at an output 198.

The pattern recognition system can be trained to recognize a large number of patterns in the reflectogram using an unsupervised leaning process. These patterns will produce different ones of the third outputs 177 and the associations between the information items 195 and the patterns are stored. This unsupervised learning process is carried out using a set of pre-stored patterns representing features of interest from existing reflectograms and running the pre-stored patterns through the processor 50 to determine the third outputs 177. The third outputs 177 are then associated with the information items 195 in the signal processor 200.

Figure 2:
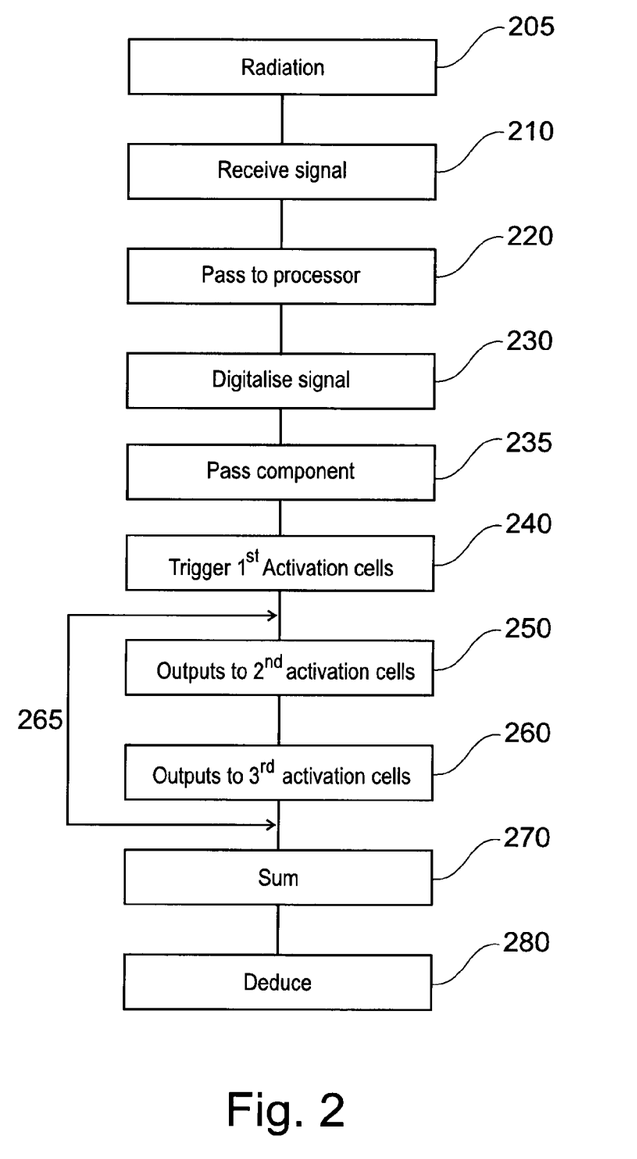
FIG. 2 shows a method for detection of a disturbance.

The system and method of the current disclosure can be used to determine and classify unknown disturbances 45, as shown in FIG. 2.

In this example of the system and method the radiation 35 is launched in step 205 into the optical fibre 20. The detector 40 receives in step 210 the back-scattered signal 37 and passes in step 235 the back-scattered signal 37 in step 220 to the processor 50. In step 230, the back-scattered signal 37 in the reflectogram is digitalised and broken into components and passed in step 235 to the first inputs 132. The components trigger the first activation cells 130 and the degree of triggering in step 240 depends on the strength of the components.

The first outputs 137 from the first activation cells 130 are transferred in step 250 to the second activation cells 140 and then to the third activation cells 170 in step 260. The activation potential of the first activation cells 130 depends upon the strength of the components in the back-scattered signal 37. These components are transferred into the lower levels and initially an apparently random sequence of third activation cells 80 appears to be fired. The firing stabilises after a certain period of time and "structures" are created within the plurality of layers 180, which reflect the features in the back-scattered signal 37.

A label 195 can be associated with the one or more features in the back-scattered signal. The structure within the plurality of layers 180 corresponds therefore to the feature. The label 195 will be input by the input device 190, such as a keyboard The procedure is repeated for a different feature. This different feature creates a different structure within the plurality of layers 180. The learning procedure can then proceed using different ones of the features.

Once the learning is complete, own feature in the back-scattered signal 37 can be detected. This u own feature generates first inputs 132 in the first activation cells 130 in step 210 which are transferred to the second activation cells 40 in step 250 to identify the features and then in step 260 into the plurality of layers 180 to enable classification of the feature. The signals in the plurality of layers 180 can be analysed and the structure within the plurality of layers 180 most corresponding to the own feature is deduced in step 280. The system can therefore output the label associated with the feature. The unknown feature is therefore identified.

Should the system be unable to identify the feature, because a new type of structure has been created in the plurality of layers 180, then the system can give an appropriate warning and human intervention can be initiated in order to review the disturbance and classify the u own feature or to resolve in the other conflicts.

The feedback in step 265 between the second activation cells 140 and the third activation cells 170 can be easily understood by considering two overlapping elements in the feature. Initially the first activation cells 130 will register the difference in the feature around the overlapping elements, but cannot discriminate the type of feature, i.e. separate out the two different features in the overlapping elements. Similarly adjacent ones of the second activation cells 140 will be activated because of the overlapping nature of the two overlapping lines. If all of the second activation cells 140 and the third activation cells 170 reacted identically, then it would be impossible to discriminate between the two overlapping features. It was explained above, however, that there is a random or stochastic element to the activation of the second activation cells 140 and to the third activation cells 170. This stochastic element results in some of the second activation cells 140 and/or the third activation cells 170 being activated earlier than other ones. The mutual interference between the second activation cells 40 or the third activation cells 170 will strengthen and/or weaken the activation potential and thus those second activation cells 140 or third activation cells 170 reacting to one of the overlapping elements will initially mutually strengthen themselves to allow the feature to be identified. The decay of the activation potential means that after a short time (milliseconds) those second activation cells 40 or third activation cells 170 associated with the identified overlapping feature diminish in strength and the other second activation cells 140 or other third activation cells 170 relating to the as yet unidentified overlapping element are activated to allow this one of the overlapping element to be identified.

In another aspect of the invention, the system can be taught to recognise a series of events which are indicative of a major disturbance. The example was given in the introduction of tapping and stealing oil from the pipeline. One way of dealing with this type of series of events is to use a series of state models, represented by the variable S0 (for initial state in which no event has occurred), S1, S2, etc. When a first one of the events is detected, then the state is switched from the initial state S0 to a first state S1. Should a second one of the series of events be initiated within a fixed period of time, the state can be switched to the second state S2. If, on the other hand, no subsequent event is detected then the state can be switched back to the initial state S0 as it can be assumed that the sequence of events is not going to occur. Similarly if a third event is detected, then the state can be switched to S3. A threshold level will be set at a state Sth. An alarm signal can be initiated if the state Sth is reached due to the sequence of events occurring.

A more detailed analysis of the sequence of events can be carried out by using Markov models on each of the various events in the sequence and then initiating the alarm signal if the Markov model indicates a probable disturbance. Other self-learning systems can be use.

The network shown in FIG. 1 can also be trained to recognise the series of events leading to the disturbance, as described above.

The invention claimed is:
1. An optical fibre sensor system comprising:
  an optical fibre;
  a radiation source for launching radiation into the optical fibre;
  a detector for detecting back-scattered radiation back-scattered from the optical fibre; and
  a signal processor connected to the detector for generating a plurality of values from the back-scattered radiation, the signal processor comprising:
    a plurality of first activation cells of an artificial neural network, the plurality of first activation cells connected to the signal processor and configured to receive a plurality of components of the back-scattered radiation;
    a plurality of second activation cells of the artificial neural network, overlapping subsets of the first activation cells being connected to ones of the second activation cells; and
    an output for summing at least outputs from a subset of the plurality of second activation cells to produce a result indicative of a location of at least one interference with the optical fibre,
    wherein the plurality of first activation cells are configured to generate a first output at a rest frequency in the absence of a first input and at an increased frequency dependent at least partially on summed first inputs from the detector.

2. The optical fibre sensor system of claim 1, wherein the radiation source is configured to launch a series of optical pulses.

3. The optical fibre sensor system of claim 1, further comprising a memory for storing a plurality of patterns representative of the at least one interference with the optical fibre or a sequence of interferences with the optical fibre.

4. The optical fibre sensor system of claim 1, wherein the second activation cells are configured to generate a second output dependent on summed and weighted ones of the first outputs.

5. The optical fibre sensor system of claim 1, wherein the artificial neural network is a computing system that simulates a biological neural network.

6. The optical fibre sensor system of claim 1, wherein the signal processor is formed from the artificial neural network.

7. An optical fibre sensor system comprising:
  an optical fibre;
  a radiation source for launching radiation into the optical fibre;
  a detector for detecting back-scattered radiation back-scattered from the optical fibre; and
  a signal processor connected to the detector for generating a plurality of values from the back-scattered radiation, the signal processor comprising:
    a plurality of first activation cells of an artificial neural network, the plurality of first activation cells connected to the signal processor and configured to receive a plurality of components of the back-scattered radiation;
    a plurality of second activation cells of the artificial neural network, overlapping subsets of the first activation cells being connected to ones of the second activation cells;
    an output for summing at least outputs from a subset of the plurality of second activation cells to produce a result indicative of a location of at least one interference with the optical fibre; and
    a plurality of third activation cells of the artificial neural network, the plurality of third activation cells arranged in layers including a middle layer and further layers, where overlapping subsets of the second activation cells are connected to ones of the third activation cells arranged in the middle layer and overlapping subsets of the third activation cells in the middle layer are connected to ones of the third activation cells arranged in at least one of the further layers, the output adapted to sum at least output one from ones of the third activation cells arranged in the further layers.

8. The optical fibre sensor system of claim 7, further configured to feedback between the at least one output of the third activation cells and an input of the second activation cells.

9. The optical fibre sensor system of claim 7, wherein the radiation source is configured to launch a series of optical pulses.

10. The optical fibre sensor system of claim 7, further comprising a memory for storing a plurality of patterns representative of the at least one interference with the optical fibre or a sequence of interferences with the optical fibre.

11. An optical fibre sensor system comprising:
an optical fibre;
a radiation source for launching radiation into the optical fibre;
a detector for detecting back-scattered radiation back-scattered from the optical fibre; and
a signal processor connected to the detector for generating a plurality of values from the back-scattered radiation, the signal processor comprising:
 a plurality of first activation cells of an artificial neural network, the plurality of first activation cells connected to the signal processor and configured to receive a plurality of components of the back-scattered radiation;
 a plurality of second activation cells of the artificial neural network, overlapping subsets of the first activation cells being connected to ones of the second activation cells; and
 an output for summing at least outputs from a subset of the plurality of second activation cells to produce a result indicative of a location of at least one interference with the optical fibre,
 wherein adjacent ones of the second plurality of activation cells are connected so as to change a response of the second plurality of activation cells dependent on the output of the adjacent ones of the second activation cell.

12. The optical fibre sensor system of claim 11, wherein the radiation source is configured to launch a series of optical pulses.

13. The optical fibre sensor system of claim 11, further comprising a memory for storing a plurality of patterns representative of the at least one interference with the optical fibre or a sequence of interferences with the optical fibre.

14. A method comprising:
launching radiation into an optical fibre;
detecting back-scattered radiation;
processing the back-scattered radiation to produce a plurality of components of the back-scattered radiation;
passing the plurality of components to a plurality of first activation cells within an artificial neural network;
triggering first outputs from the first activation cells;
passing the first outputs to a subset of second activation cells within the artificial neural network;
triggering second outputs from the subset of the second activation cells;
summing the second outputs from a plurality of subsets of the second activation cells;
calculating, by a programmable processor associated with the artificial neural network, a location of an interference with the optical fibre based on a change in a frequency of the summed second outputs;
passing the second outputs to a subsection of third activation cells arranged in a middle layer of a plurality of layers of third activation cells within the artificial neural network;
triggering at least one of the third activation cells arranged in the middle layer to provide third outputs to ones of the third activation cells arranged in further layers; and
deducing the location of the interference with the optical fibre from summed and weighted ones of third outputs of the third activation cells.

15. The method of claim 14, wherein outputs of at least one of the third activation cells are fed back to inputs of at least one of the second activation cells.

16. The method of claim 14, further comprising recognising a sequence of interferences with the optical fibre, the sequence of interferences including the interference.

17. A method comprising:
launching radiation into an optical fibre;
detecting back-scattered radiation;
processing the back-scattered radiation to produce a plurality of components of the back-scattered radiation;
passing the plurality of components to a plurality of first activation cells within an artificial neural network;
triggering first outputs from the first activation cells;
passing the first outputs to a subset of second activation cells within the artificial neural network;
triggering second outputs from the subset of the second activation cells;
summing the second outputs from a plurality of subsets of the second activation cells; and
calculating, by a programmable processor associated with the artificial neural network, a location of an interference with the optical fibre based on a change in a frequency of the summed second outputs,
wherein the second outputs decay over time.

18. The method of claim 17, further comprising:
recognising a sequence of interferences with the optical fibre, the sequence of interferences including the interference.

19. The method of claim 17, wherein outputs of at least one of the third activation cells are fed back to inputs of at least one of the second activation cells.

20. A method comprising:
launching radiation into an optical fibre;
detecting back-scattered radiation;
processing the back-scattered radiation to produce a plurality of components of the back-scattered radiation;
passing the plurality of components to a plurality of first activation cells within an artificial neural network;
triggering first outputs from the first activation cells;
passing the first outputs to a subset of second activation cells within the artificial neural network;
triggering second outputs from the subset of the second activation cells;
summing the second outputs from a plurality of subsets of the second activation cells; and
calculating, by a programmable processor associated with the artificial neural network, a location of an interference with the optical fibre based on a change in a frequency of the summed second outputs,
wherein a first output of at least one of the first activation cells affects a second output of at least another one of the second activation cells.

21. The method of claim 20, further comprising:
recognising a sequence of interferences with the optical fibre, the sequence of interferences including the interference.

22. The method of claim 20, wherein outputs of at least one of the third activation cells are fed back to inputs of at least one of the second activation cells.

23. A method comprising:
launching radiation into an optical fibre;
detecting back-scattered radiation;
processing the back-scattered radiation to produce a plurality of components of the back-scattered radiation;
passing the plurality of components to a plurality of first activation cells within an artificial neural network;
triggering first outputs from the first activation cells;
passing the first outputs to a subset of second activation cells within the artificial neural network;
triggering second outputs from the subset of the second activation cells;
summing the second outputs from a plurality of subsets of the second activation cells; and
calculating, by a programmable processor associated with the artificial neural network, a location of an interference with the optical fibre based on a change in a frequency of the summed second outputs,
wherein the triggering of the second outputs has a stochastic component.

24. The method of claim 23, further comprising:
recognising a sequence of interferences with the optical fibre, the sequence of interferences including the interference.

25. The method of claim 23, wherein outputs of at least one of the third activation cells are fed back to inputs of at least one of the second activation cells.

* * * * *